Sept. 25, 1923.                    M. GUERRIERI                    1,468,715
                                   TOOL HOLDER
                                 Filed May 2, 1921
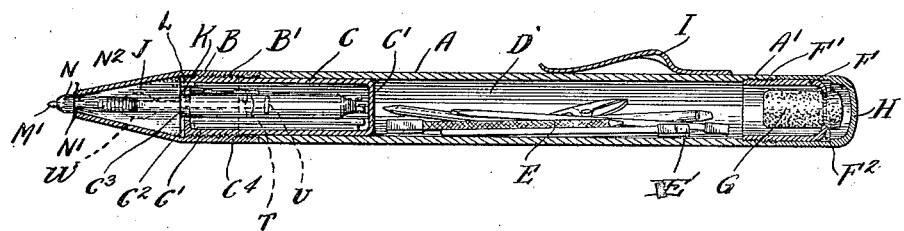
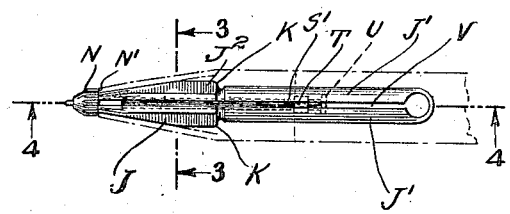   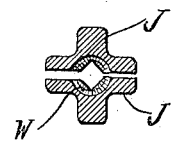
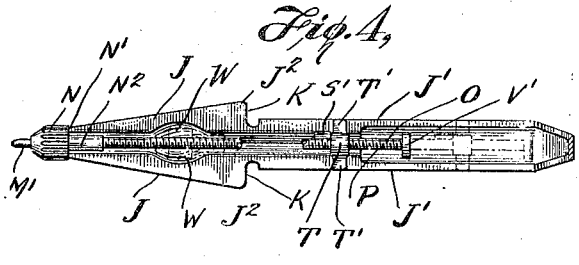   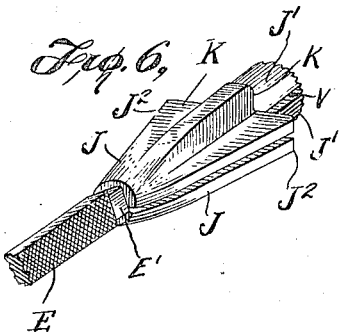
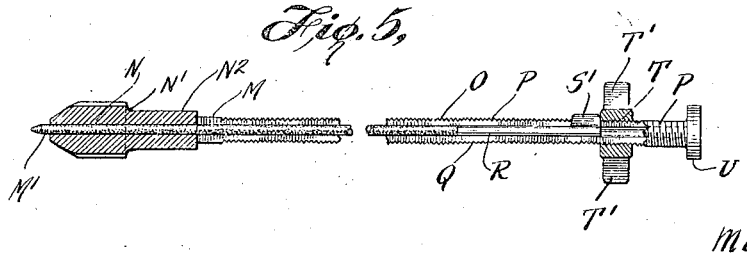
INVENTOR
Michael Guerrieri
BY
Frank M. Ashley
ATTORNEY Patented Sept. 25, 1923.

1,468,715

UNITED STATES PATENT OFFICE.

MICHEAL GUERRIERI, OF NEWARK, NEW JERSEY.

TOOL HOLDER.

Application filed May 2, 1921. Serial No. 466,033.

*To all whom it may concern:*

Be it known that MICHEAL GUERRIERI, citizen of the United States, and resident of Newark, New Jersey, has invented certain new and useful Improvements in Tool Holders, of which the following is a specification.

My invention relates to tool holders and pencil holders and is particularly adapted for use by manicurists.

The object of my invention is to provide a tool holder and pencil holder and a casing to serve as a holder for the tools when not in use and as a tool holder by means of which the shank of a tool may be firmly held in the act of using the tool.

Referring to the drawings which form a part of this invention,—

Fig. 1 is a longitudinal sectional view of a construction embodying my invention;

Fig. 2 is a longitudinal exterior view of the chuck portion of the tool holder with the lead pencil holder held therein in operative position, the outer casing being indicated in dotted lines;

Fig. 3 is a cross sectional view on line 3—3 of Fig. 2;

Fig. 4 is a longitudinal sectional view on a larger scale of the construction shown in Fig. 2;

Fig. 5 is a longitudinal sectional view of the pencil casing which is normally carried within the tool holder casing at its forward end; and Fig. 6 is a perspective view of the chuck jaws made on an enlarged scale and showing the shank of a tool held by said jaws.

A indicates a cylindrical casing and B the outer portion of the chuck by means of which the jaws of the chuck are closed. C indicates a tube fitted in the forward end of the casing A and permanently secured thereto and having its inner end closed by diaphragm C' which may be formed integral as illustrated and serves to form an end wall for the chamber D formed in the casing A and serving to hold the tools E when not in use. The outer end of the casing A is provided with a thread A' adapted to engage with the thread F' of the cylindrical eraser holder F, which holder also serves to close the outer end of the casing A to form the closed chamber D. G indicates a rubber eraser for erasing marks made by a lead pencil, and is held in the outer end of the holder F by the inwardly turned portion F² which forms a flange within which the eraser is firmly held. H indicates an outer cap which fits in sliding frictional engagement over the outer surface of the tubular eraser holder F. I indicates a clip.

The forward end C' of the tube C is turned inwardly at a right angle to the axis of said tube to form a flange C² having a central opening C³ and is also provided with a thread C⁴ to engage the thread B' of the member B. The forward end of the member B is conical in form to conform to the outer conical surfaces of the jaws J—J respectively which are formed integral with the shank members J'—J' respectively, the ends of which are connected together by an integral portion J² constituting a spring by reason of the spring quality of the metal comprising these parts. They are formed in a die under strong pressure, the chuck jaw portions flowing into the forms illustrated as provided in the dies. The jaws J—J are formed to provide a square opening between them or other suitable irregular form may be used, to hold the square shank E' of the tools to be held thereby. The shank portions J'—J' are smaller in diameter than the back end J²—J² respectively of the jaw members thus providing shoulders K—K which abut the flange C² when the member B is turned on the thread to tighten or close the jaws, and the conical inner surface of the member B forces the jaws toward each other to clamp them on the shank of the tool, the jaws being held from rotational movement by a pin L which is firmly secured to the flange C² at one end and projects into a small recess or hole formed in one of the shoulders K in sliding engagement with the walls thereof. M indicates a tubular holder for the lead of a pencil M'. It comprises a chuck portion N having an annular shoulder N' and shank portion N² of reduced diameter and a tube O having a thread P formed in its outer surface. The tube O is provided with a slot Q extending nearly its whole length. A rod R of about the same diameter as that of the lead M' is fitted to slide in the bore of the tube and is provided with a wing S at one side thereof, which extends through the slot beyond the outer periphery of the tube. A wing nut T fits over the screw P and abuts the wing S. A flange V' mounted on the tube O prevents the nut T from screwing off the tube. The nut T is provided with wings T'—T' respectively which are adapted to project between the shank members J'—J' respectively and rest in the space V (see Fig. 2) between them. When the holder M is in position as illustrated in Figs. 1, 2 and 4, the portion N can be turned by the fingers and since the wings T', T' on the nut T cannot turn, the nut travels on the thread P and propels the lead through the instrumentality of the wing S and rod R and then by screwing the member B on the thread B' the shank $N^2$ is clamped by the jaws J—J and the pencil used for writing, or if preferred, the member B may be removed from the holder and the pencil positioned in the tube O by holding the nut T with the fingers while turning the chuck end N as will be readily understood.

The pencil and its parts is normally carried in the front end of the tool holder when not in use, each jaw J—J being formed with a recess W—W respectively as shown in in which the chuck end N of the pencil holder rests thus leaving the jaws J—J free to hold the shanks of the regular tools.

The entire construction as manufactured is about two-thirds the size of the drawing shown in Fig. 1 and therefore may be carried in the pocket like a fountain pen.

Having thus described my invention, I claim as new:

1. A tool holder having jaws and comprising a casing divided into two chambers, one of which is adapted to hold tools designed for use with the tool holder and the other adapted to hold one of said tools while a second tool is held in the jaws of said tool holder.

2. A tool holder comprising a casing of thin metal, a cylindrical tube of less diameter secured to one end of said casing and provided with a thread on its exterior surface, and having an inwardly extending flange at its exposed end, a conical member provided with a thread to engage the thread on said tube, jaws having a shank extending into said tube and also having shoulders abutting said flange and held in contact therewith by said conical member, said jaws each being formed with a recess for the purpose set forth.

3. A tool holder comprising a casing of thin metal, a cylindrical tube of less diameter secured to one end of said casing and provided with a thread on its exterior surface, and having an inwardly extending flange at its exposed end, a conical member provided with a thread to engage the thread on said tube, jaws having a shank extending into said tube and also having shoulders abutting said flange and held in contact therewith by said conical member, said jaws each being formed with a recess for the purpose set forth, and a tool, one end of which rests in said recess.

4. A tool holder comprising a casing of thin metal, a cylindrical tube of less diameter secured to one end of said casing and provided with a thread on its exterior surface, and having an inwardly extending flange at its exposed end, a conical member provided with a thread to engage the thread on said tube, jaws having a shank extending into said tube and also having sholders abutting said flange and held in contact therewith by said conical member, said jaws each being formed with a recess for the purpose set forth, and a tool held in a separate casing and adapted to be held in the jaws of said tool holder.

5. A tool holder comprising a casing of thin metal, a cylindrical tube of less diameter secured to one end of said casing and provided with a thread on its exterior surface, and having an inwardly extending flange at its exposed end, a conical member provided with a thread to engage the thread on said tube, jaws having a shank extending into said tube and also having shoulders abutting said flange and held in contact therewith by said conical member, said jaws each being formed with a recess for the purpose set forth, and a tool held in a separate casing and adapted to be held in the jaws of said tool holder.

Signed at the city of New York, in the county of New York and State of New York, this 22nd day of April, 1921.

MICHEAL GUERRIERI.